June 29, 1937.  V. A. LANG  2,085,321

PIPE CLAMP

Filed Feb. 1, 1935

Inventor
Victor A. Lang

By Hardway Cathey
Attorneys

Patented June 29, 1937

2,085,321

UNITED STATES PATENT OFFICE 2,085,321

PIPE CLAMP

Victor A. Lang, Houston, Tex.

Application February 1, 1935, Serial No. 4,529

6 Claims. (Cl. 29—67)

This invention relates to a pipe clamp.

An object of the invention is to provide a pipe clamp, or holder, particularly designed for the purpose of clamping and holding pipe in a secure position while the same is being operated on.

Another object of the invention is to provide a pipe holder in which the pipe may be readily secured and from which the pipe may be readily released.

Another object is to provide a clamp of the character described that may be adjusted to take pipes of different diameters.

A still further object is to provide a pipe clamp of the character described having a guide for guiding a saw used to sever the pipe into sections, said clamp being adjustable to take saws of different thicknesses.

With the above and other objects in view, the invention has particular relation to certain novel features of construction, operation, and arrangement of parts, an example of which is given in this specification, and illustrated in the accompanying drawing, wherein:—

Figure 1:
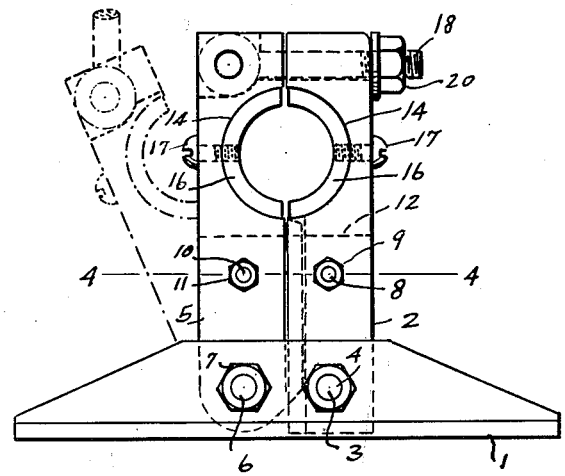
Fig. 1 shows an end view of the clamp.
Figure 2:
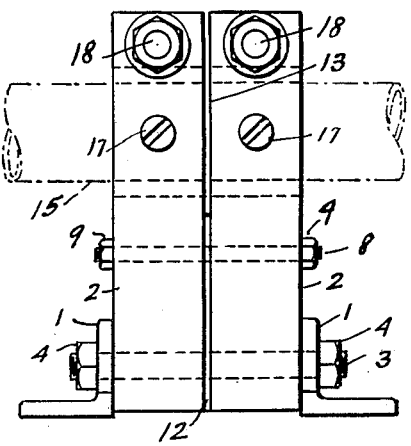
Fig. 2 shows a side view.
Figure 3:
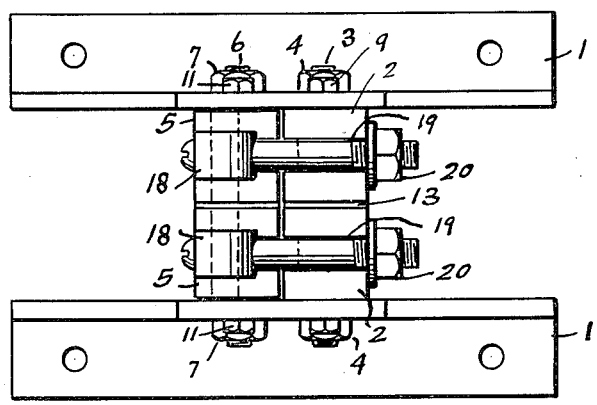
Fig. 3 shows a top plan view.
Figure 4:
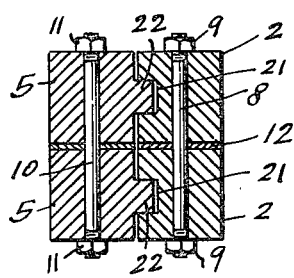
Fig. 4 shows a cross-sectional view taken on the line 4—4 of Fig. 1.

In the drawing, the numerals 1, 1, designate side supports formed of angle irons, and between these angle irons, there is a pair of upstanding clamps 2, 2. These clamps are secured in position by means of a transverse bolt 3 which is fitted through aligned bearings in the upstanding flanges of the supports 1, and in the clamps 2, 2. The clamp bolt is threaded at its ends to receive the clamp nuts 4, 4.

Adjacent the fixed clamps 2 is the pair of pivotally mounted clamps 5, 5. The clamps 5 are pivoted on the transverse bolt 6 which is fitted through aligned bearings in said upstanding flanges, and in the lower ends of the clamps 5. The ends of the bolt 6 are threaded to receive the clamp nuts 7, 7.

The pairs of clamps 2 are secured together by the bolt 8 which is fitted transversely through them and secured therein by the nuts 9, and the clamps 5 are secured together by means of the transverse bolt 10 which is fitted through them and whose ends are threaded to receive the nuts 11.

Between the lower ends of the clamps, there is a shim 12 forming a spacer to provide a saw space 13 between the clamps of each pair.

Above the shim 12, the clamps have the complemental round grooves 14, 14, extending transversely across their adjacent faces to provide gripping surfaces for the pipe 15 to be held.

Provision may be made for gripping smaller pipe by inserting gripping jaws 16, 16, in the complemental grooves which may be retained therein by the retaining screws 17, 17.

Latches 18, 18, are pivoted to the upper ends of the clamps 5 and are adapted to be swung into grooves 19, 19, in the upper ends of the clamps 2, and the free ends of these latches are threaded to receive the nuts 20, 20, whereby clamps may be secured around the pipe so as to grip the same firmly.

The adjacent faces of the clamps beneath the gripping jaws 16 are provided, one with vertical mortises 21, 21, to receive the vertical tenons 22 of the other whereby the clamps may be maintained in vertical alignment while gripping the pipe.

While the pipe is so held, a saw may be inserted in the space 13 of a thickness to snugly fit therein and the pipe may be sawed in two along a plane exactly at right angles to the axis of the pipe.

The drawing and description disclose what is now considered to be a preferred form of the invention by way of illustration only, while the broad principle of the invention will be defined by the appended claims.

What I claim is:

1. A pipe holding device comprising confronting clamps arranged to open and close, complemental grooves in the facing sides of the clamps to receive a pipe when the clamps are closed, a pivotally mounted latch on one of said clamps adapted to fit into a corresponding groove on the other of said clamps to secure the clamps in gripping relation with the pipe in the grooves, said clamps being separated by a removable shim forming a saw space at approximately right angles to the axis of the pipe gripped by the clamps.

2. A pipe holding device comprising confronting clamps arranged to open and close, complemental grooves in the facing sides of the clamps to receive a pipe when the clamps are closed, means for securing the clamps in gripping relation with the pipe in the grooves, said clamps having a saw space at approximately right angles to the axis of the pipe gripped by the clamps, said clamps being separated by a removable shim and having bolts which are adjustable to vary the width of the saw space.

3. A pipe holding device comprising two confronting pairs of clamps arranged to open and close, the facing sides of said pairs having complemental pipe gripping surfaces shaped to receive a pipe between them and to grip the pipe when the clamps are closed, releasable means comprising a pivotally mounted latch in one of said clamps and a corresponding groove in the other of said clamps to hold the clamps in closed position to grip the pipe, and a removable shim for spacing the clamps of each pair apart to provide a saw space between them.

4. A pipe holding device comprising confronting clamps arranged to open and close, the facing sides of said clamps having complemental pipe gripping surfaces shaped to receive a pipe between them and to grip the pipe when the clamps are closed, a removable shim between the clamps providing saw space, releasable means to hold the clamps in closed position to grip the pipe, the pairs of clamps having intermeshing parts comprising tenons sunk in the face of one clamp and studs projecting from the face of the other clamp to maintain the pairs in alignment when the clamps are closed into pipe gripping position.

5. A pipe holding device comprising pipe gripping clamps arranged to open and close, a removable shim between said clamps providing saw space, detachable gripping jaws mounted in said clamps, set bolts for securing said gripping jaws in place, latch means pivotally mounted on one of said clamps and adapted to engage the other clamp and hold the same in gripping position.

6. A pipe holding device comprising pipe gripping clamps arranged to open and close, detachable gripping jaws mounted in said clamps, set bolts for securing said gripping jaws in place, latch means pivotally mounted on one of said clamps and adapted to engage the other clamp and hold the same in gripping position, the pipe gripping clamps comprising two pairs of clamps which are adjustably spaced apart to provide a saw space between them, a shim between said clamps to hold the clamps in the desired position.

VICTOR A. LANG.